Oct. 10, 1950 — M. P. WINTHER — 2,525,571
DYNAMOELECTRIC MACHINE CONTAINING A MAGNETIC FLUID MIXTURE
Filed May 21, 1948 — 3 Sheets-Sheet 1

Martin P. Winther, Inventor.
Haynes and Koenig, Attorneys.

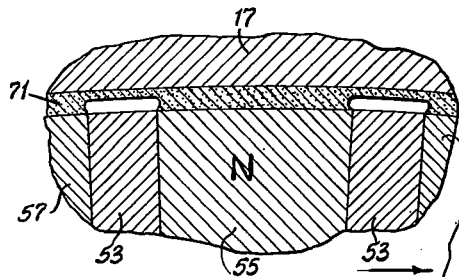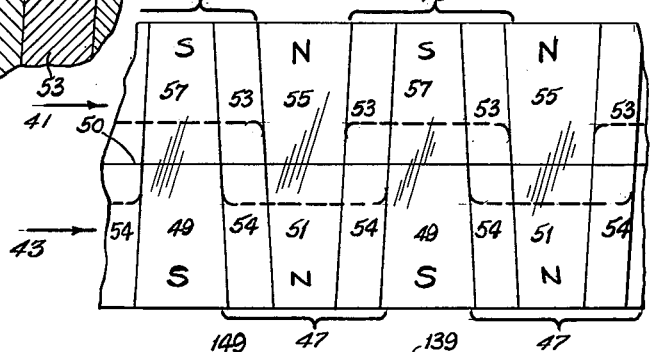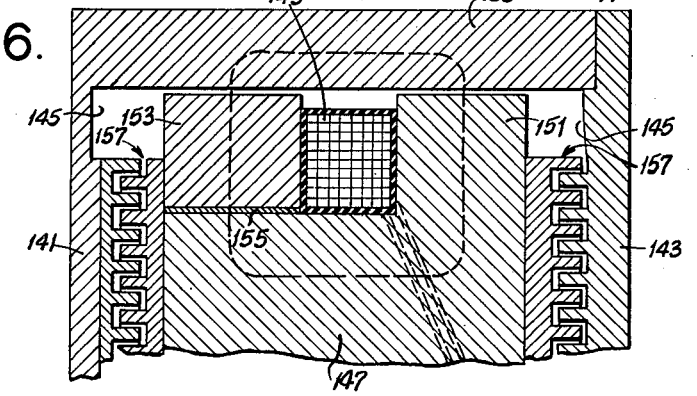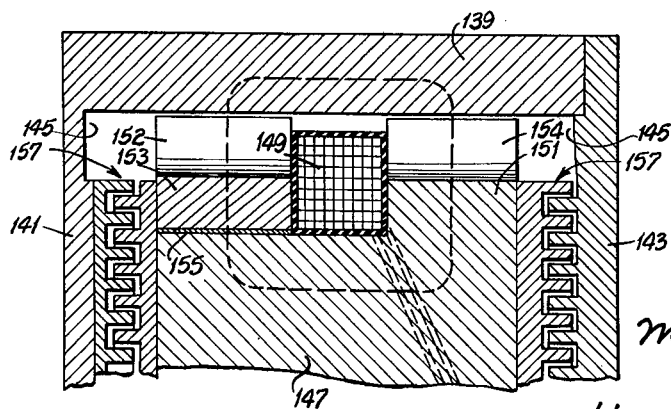

Oct. 10, 1950

M. P. WINTHER
DYNAMOELECTRIC MACHINE CONTAINING
A MAGNETIC FLUID MIXTURE 2,525,571

Filed May 21, 1948

SLIP IN R.P.M. BETWEEN CLUTCH MEMBERS

Martin P. Winther,
Inventor.
Haynes and Koenig,
Attorneys.

Patented Oct. 10, 1950

2,525,571

UNITED STATES PATENT OFFICE 2,525,571

DYNAMOELECTRIC MACHINE CONTAINING A MAGNETIC FLUID MIXTURE

Martin P. Winther, Waukegan, Ill., assignor to himself as trustee

Application May 21, 1948, Serial No. 28,452

15 Claims. (Cl. 192—84)

This invention relates generally to dynamoelectric machines; more particularly to electric clutches employing a granular magnetic material; and with regard to certain more specific features, to a combined eddy-current and magnetic-fluid clutch.

Among the several objects of the invention may be noted the provision of a combined eddy-current and magnetic-fluid clutch in which each component overcomes inherent disadvantages existing in the other; the provision of an electric clutch of the class described which may be operated without slip, or with slip if desired to absorb tortional vibrations; the provision of a magnetic-fluid clutch in which energy losses during pick-up are reduced, and practically eliminated during both idling and locked driving conditions; the provision of a clutch of the class described having greatly increased torque capacity for a given excitation, weight and size; the provision of a clutch of this class which will respond to excitation control with minimum time lag; and the provision of a mechanically improved magnetic-fluid clutch in which the magnetic fluid is contained without leakage. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 4 is a view similar to Fig. 3, but showing the position of said magnetic fluid under conditions of excitation;

Fig. 5 is a fragmentary developed view taken on line 5—5 of Fig. 2;

Fig. 6 is a partial axial section similar to Fig. 1, but showing an alternative pole form for operation with magnetic fluid but without eddy currents;

Fig. 7 is a view similar to Fig. 6, showing another pole form for operation with eddy currents and magnetic fluid;

Similar reference characters indicate corresponding parts throughout the several views of the drawings.

Eddy-current clutches per se operate with an inherent slip which, while small, it is sometimes desirable should be eliminated. Magnetic-powder and magnetic-fluid clutches per se have inherent frictional losses in the magnetic fluid during idling and pick-up; undesirably high excitation currents and excessive time lag of response to control; and bearing difficulties from the magnetic fluid. By the present invention, the eddy-current and magnetic-fluid components complement each other so that each eliminates inherent difficulties associated with the other, besides producing a much smaller device for a given capacity.

Figure 1:
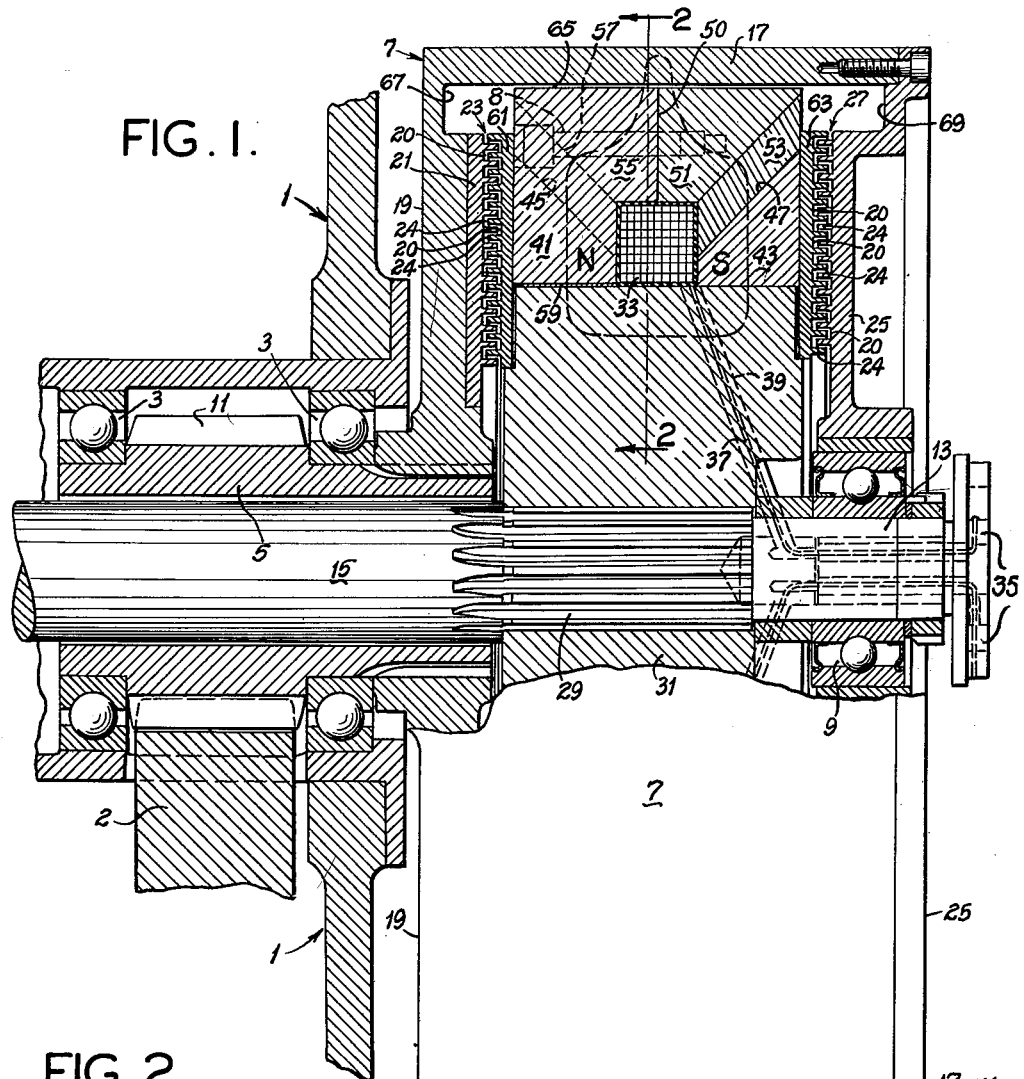
Fig. 1 is an axial section of apparatus incorporating one form of the invention employing eddy currents and magnetic fluid.

Referring now more particularly to Fig. 1, there is shown at numeral 1 a support carrying bearings 3 for a driving quill 5 to which is splined a liquid-tight rotary casing 7. This casing forms a liquid-carrying chamber, as will appear. The quill 5 is driven from any suitable source, for example, from a gear 11 formed in its periphery. Numeral 2 indicates an exemplary driving gear.

The casing carries a bearing 9 for supporting the end 13 of a driven shaft 15. The driven shaft 15 is suitably coupled to a device to be driven (not shown). An outer cylinder 17 of the rotary casing 7 is composed of magnetic material, for purposes which will also appear. The left end 19 of this case is magnetic, but this is incidental to the one-piece construction of 17 and 19. This end 19 carries a non-magnetic (for example, aluminum) liner 21, shaped to form one component of a labyrinth seal 23. A right end 25 of the case is non-magnetic (preferably aluminum) and formed interiorly as one component of a second labyrinth seal 27.

Carried on splines 29 of the driven shaft 15 is a magnetic drum 31. Positioned around the drum 31 is an annular exciter coil 33 which is provided with exciting current. This is accomplished by means of suitable leads 37 passing from outer collector rings 35 through passages 39. Suitable brushes (not shown) are used in association with the rings 35 to provide direct current which may be controlled from zero to full value by appropriate usual circuit means (not shown).

Around the drum 31 and on opposite sides of the coil are located magnetic rings 41 and 43 which are notched as indicated at 45 and 47, respectively. Between the notches 45 in ring 41 are magnetic pole heels 55. Between the notches 47 in ring 43 are magnetic pole heels 49. In the notches 45 are pole toe pieces 57 and in the notches 47 are pole toe pieces 51. The parts 51 and 57 are made separate so that they can be handled as inserts for organization with their respective rings 43 and 41 by means of cast non-magnetic material such as, for example, cast aluminum 54 and 53, respectively. Molded plastic such as "Bakelite" may be substituted for the aluminum 54 and 53. The heel and toe parts 49 and 57, and the heel and toe parts 55 and 51 are in magnetic contact at a parting plane 50. The purpose of this construction is to provide interdigitated magnetic pole extensions 55, 51, 49, 57 while at the same time permitting assembly of the ring parts 41 and 43 around the coil 33. Thus (Fig. 5) on the upper side of the parting plane 50 the pole heel parts 55 are carried between the opposite pole end parts 57, being held in place by the cast aluminum matrix 53. This forms the ring 41. On the lower side of the parting plane 50 the parts 49 and 51 are held together by the cast aluminum matrix 54. This forms the other ring 43. Thus the coil is enveloped inside by the magnetic drum 31, on its ends by the magnetic rings 41 and 43, and outside by staggered interdigitated magnetic pole extensions 55, 51, 49, 57. The contacts between parts 55 and 51 on the one hand, and 49 and 57 on the other hand, are magnetic without a gap. The same is true as to the contact between the ring 43 and the drum 31. The result is an interdigitated pole construction enveloping the coil 33. The poles face the cylinder 17 which becomes an inductor. The reason for carrying out the construction according to the details shown is to provide for assembly of the rings 41 and 43 and associated parts around the coil. Assembly is maintained by fasteners 8. The ring 41 and the drum 31 have a thin, cylindric, non-magnetic insert 59 to provide a fixed relatively high reluctance magnetic gap of a few thousandths of an inch in the magnetic circuit. The mean toroidal magnetic path is suggested by the dash lines in Fig. 1. This path or circuit is from the drum 31 into ring 41 via the non-magnetic insert 59, through pole extension 55, 51, into the drum 17, then from the drum into the pole extension 57, 49, through ring 43 and back into the drum 31. It should be observed that the flux path is not interrupted by the non-magnetic material 53 or 54. The purpose of this material 53 and 54 besides holding the parts for easy assembly, is also to act as a mechanical filler between the pole extensions 55, 51 and notches 47; also between the pole extensions 49, 57 and notches 45, so that an unbroken peripheral cylindric form is presented by the parts carried upon shaft 15. The purpose of the flux gap at 59 will develop.

On the sides of the drum 31 and rings 41 and 43 are carried non-magnetic (aluminum, for example) complementary inner elements 61 and 63 respectively of the labyrinth seals 23 and 27. Grooves 20 and interdigitated collars 24 form the labyrinth passages of the labyrinth seals. Clearance exists between the grooves and collars, there being no rubbing.

A small air gap 65 of relatively high reluctance is left between the magnetic drum 17 and the interdigitated teeth 55, 51, 57, 49. This gap 65 is of several hundredths inch magnitude. The casing ends 19 and 25 are formed laterally with annular recesses or reservoirs 67 and 69, respectively, adapted to carry a suitable supply of magnetic flowable material or fluid 71, which is not shown in Fig. 1 but is shown in the detail Figs. 3 and 4. The reservoirs 67 and 69 communicate with the gap 65.

The magnetic fluid 71 comprises for example a fairly thin machine oil, such as SAE No. 10 or the equivalent, mixed with nine parts by weight of finely divided or granulated magnetic, relatively low reluctance metal particles. The particles should preferably be as round as feasible and of small mean diameter (approximately 8 microns). This amounts to a powder. A suitable finely divided magnetic iron serving the purpose is on the market under the name of Carbonyl-E iron. Another is Swedish powdered iron of about 300 mesh. This mixture of 9:1 of iron particles to oil is a somewhat viscous fluid. It acts like a heavy cream, which will seek a level in a centrifugal or gravity force field, although rather sluggishly. The fluid component functions as a lubricant for the granulated particles. The mixture will also become magnetized by induction. In cases where the clutch is to be used under varying (including low) temperature conditions, the liquid should have as constant a viscosity as it is possible to obtain. Fairly constant-viscosity oils are on the market. Or silicone liquids may be used (silicone DC 500 for example).

An amount of the stated magnetic fluid 71 is introduced into the case 7, where it normally takes up a position at the bottom, primarily in the reservoirs 67 and 69. The reservoirs should be large enough to prevent the amount of magnetic fluid employed from leveling up into the spaces in the labyrinths 23 and 27 when the clutch is stationary and the fluid has gravitated to the bottom.

The volume of the magnetic fluid mixture is sufficient only to form a thin film fully across the inside face of the drum 17 (throughout the gap 65 and reservoirs 67, 69) under the influence of the centrifugal force when the drum is rotating at sufficient speed to maintain such a film. The thickness of the film under these rotating conditions is not great enough to touch the outer faces of the magnetic poles 57, 49, 55, 51, as illustrated, for example, in Fig. 3. The resulting clearance shown at 73 between the film 71 and the poles avoids viscous drag and consequent generation of heat when the case 7 idles at substantial speed. Drag and heat generation are only dangerous under high relative speeds of the clutch members. At relatively low speeds (for example upon starting) it is not important whether or not the film 71 touches the pole ends. Thus under initial starting conditions of the case 7, the fact that the film 71 does not promptly form throughout the entire periphery is unimportant. This is particularly true in view of the filling 53 which with the poles presents a smooth mechanical cylinder to fluid drag. However, the film does form at the higher speeds and when formed, all of the magnetic fluid in the case 7 is entirely free from interference with or by the relatively rotary parts on the drum 31. Hereinafter the drum 17 will be called the inductor drum or armature and the drum 31 with associated pole parts the field member.

Any magnetic fluid which is not held in the stated film under low-speed conditions of course tends, as stated, to drop to the bottom of the casing 7. Under such conditions this fluid will be kept from the central portions of the machine by centrifugal action of the relatively moving parts 20 and 24 of the labyrinth seals 23 and 27. Even under stationary conditions the seals 23 and 27 guide all of the fluid around to the bottom of the drum 7 without escape. For example, if any fluid tends to enter the periphery of either labyrinth at the top, even under stationary conditions, it runs around one or more of the outer collars 24 and finds its way to the bottom of the machine before it can find its way radially into the center. At relatively high speeds all the liquid is held out against the inside of the drum 17. Thus under no conditions is it possible for the iron-oil mixture to escape or reach the bearings of the machine.

Figures 2, 3:
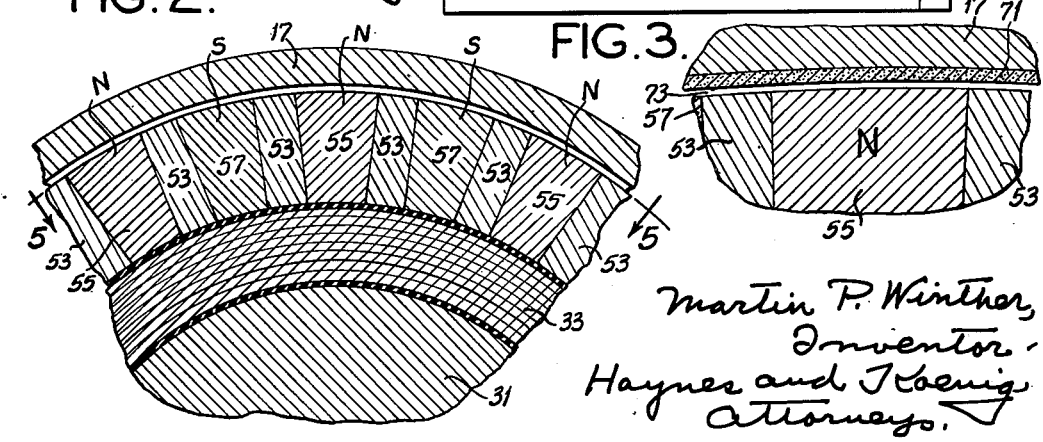
Fig. 2 is a fragmentary cross section taken on line 2—2 of Fig. 1.
Fig. 3 is an enlarged fragmentary section similar to parts of Fig. 2, but showing the position of certain magnetic fluid under rotary conditions without excitation.

In view of the above, it will be seen that under relatively high angular velocities the drum, the conditions shown in Fig. 3 will occur, wherein there is no viscous drag between the magnetic fluid and the field member. Hence there is no energy loss from this source nor any tendency for the driven shaft to creep.

In order to operate the clutch, the coil 33 is energized. This may be accomplished gradually, if desired. Energization will cause the magnetic rings 41 and 43 to become excited north and south respectively. Consequently, the alternate interdigitated poles become north and south. Which are north or south depends upon the direction of current in coil 33, but the choice is optional. Exemplary north and south relationships are shown in Figs. 1-5. Two effects result. First, any flux which sweeps through the drum 17 induces eddy currents therein which produce a reactive magnetic field, causing a reactive torque tending to accelerate the field member, including drum 31 and the driven shaft 15. At the same time, the magnetic fluid 71 is inductively magnetized and attracted. It flows toward the magnetized gap 65, tending to fill it opposite the pole ends. The conditions in this respect change from those shown in Fig. 3 to those shown in Fig. 4. Also, the magnetic fluid becomes stiffer (due to attraction between its particles) and its internal friction increases. The stronger the poles are magnetized, the stronger will be the stated effect of drawing in the magnetic fluid mixture and the stiffer it becomes. Under suitable excitation, all angular slip between the inductor member and the field member ceases, so that there is a locked effect with no slip. It should however be understood that the frictional connection afforded by the magnetic fluid is effective to transmit torque under slip conditions. Under slip conditions, the operation by eddy-currents in the drum 17 accounts for a portion of the transmitted torque. Thus the churning and heating of the magnetic fluid is minimized under slip conditions because eddy-current operation aids in torque transmission.

When excitation is reduced, the flux will die out, owing to the non-magnetic material 59 in the magnetic circuit. The insertion of this material in the magnetic circuit is desirable because at all other points in the circuit will be magnetic material tending to perpetuate the magnetic circuit. If this non-magnetic material 59 were not used, the clutch would not release as promptly as to allow slip when desired, and its minimum torque capacity would be relatively high when the coil is deenergized. At least this would be true for the magnetic fluid described. With the construction described at 59 deenergization of the magnetic circuit more or less proportionally and promptly follows the deenergization of the coil. As soon as the flux density through the magnetic fluid in the gap is reduced, the fluid softens or loses its high internal friction and under the stated centrifugal action of the armature or inductor drum 17 spreads out into the thin film of Fig. 3, thus approaching release conditions. It should be noted that the gap material such as 59 could with equal effect be placed in the inductor part of the flux field circuit instead of in the field member.

The interdigitated-tooth form of the field member also aids in prompt demagnetization of both inductor 17 and of the magnetic fluid 71. This is because the alternating effect of any residual magnetism in the poles by reversal demagnetizes the swept materials of both the drum 17 and magnetic fluid 71. This action continues until the relative motions die out between the inductor and field members. All that is required for complete demagnetization after deenergizing the coil 33 is relative movement between the field and inductor of one pitch distance between the north and south poles to accomplish complete demagnetization. Obviously, this condition is far exceeded in practice and prompt demagnetization is assured without employing low-rententive magnetic material such as for example a nickel steel.

In Fig. 6 is shown another form of the invention similar to that shown in Fig. 1, in which the magnetic armature or inductor drum is indicated at 139, its ends being shown at 141 and 143, providing the reservoirs 145. The magnetic rotor is shown at 147. It carries the exciting coil 149 between a continuous integral magnetic flange 151 and a magnetic ring 153. The ring 153 is carried on the rotor 147 but separated therefrom by a thin layer of non-magnetic material 155. The toroidal flux field of the coil 149 will have a mean flux path as suggested by the dash lines. In this case, one ring becomes north and the other south and there are no polar teeth, the rings themselves forming continuous poles. The magnet fluid 71 acts in the same way as in the Fig. 1 form except that even during slip condition neither it nor the inductor 17 is subjected to any reversing polarities. Hence there is no eddy-current torque action. Torque is transmitted at all times by the magnetic fluid only. The magnetic fluid is kept from the central bearings by means of labyrinth sealing g'ands 157, similar to those already described. In this form since there are no polar reversals demagnetization of the magnetic fluid is not effected by relative motions. However, demagnetization may be encouraged by using for the magnetic fluid a material which readily loses its magnetic properties when the exciting field is withdrawn. For example, by making the magnetic particles of an alloy steel of a high nickel content, this form of clutch will, in view of the magnetic gap 155, release quickly when the excitation is brought to zero.

If desired, eddy-current action can be introduced in the form of the invention shown in Fig. 6 by axially notching at intervals the outer surfaces of the pole rings 151 and 153, as shown at 152 and at 154 in Fig. 7. These notches may or may not be infilled with non-magnetic filler. They are shown without it in Fig. 7. The other parts of Fig. 7 are like those of Fig. 6. Thus this non-interdigitated tooth form of the invention (Fig. 7), so far as eddy-current operation only is concerned, would function similarly to the apparatus shown in United States Patent 2,106,542. This action will be combined with the magnetic-fluid clutching action already described. In this case the torque due to eddy currents is brought about by variations in flux in the inductor 139, as distinguished from reversals of flux brought about by the Fig. 1 form of the invention. In Fig. 1 a given area of the armature or inductor 17 is swept by reversing flux fields to produce reversing eddy currents, whereas a given area of the armature or inductor 139 in Fig. 7 is swept by a varying flux field of a given polarity so as to produce varying non-reversing variable eddy currents. Under the principles of the invention, various other pole forms may be used, such as individually wound salient poles, as illustrated in said Patent 2,106,542. However, the interdigitated tooth form which is shown in Fig. 1 is preferable because of the more effective eddy current action, automatic demagnetizing effect and reduction in size of the unit.

It is to be understood that either of the relatively rotary field or inductor members may constitute the driver or driven member and that the annular coil may, instead of being mounted upon the polar field member, be mounted on the inductor member or even upon a third stationary member, provided it is so arranged that its toroidal field interlinks the polar field and inductor members. Inversions of this type are known in apparatus of this general class and do not affect the action (see for example said Patent 2,106,542).

Figure 8:
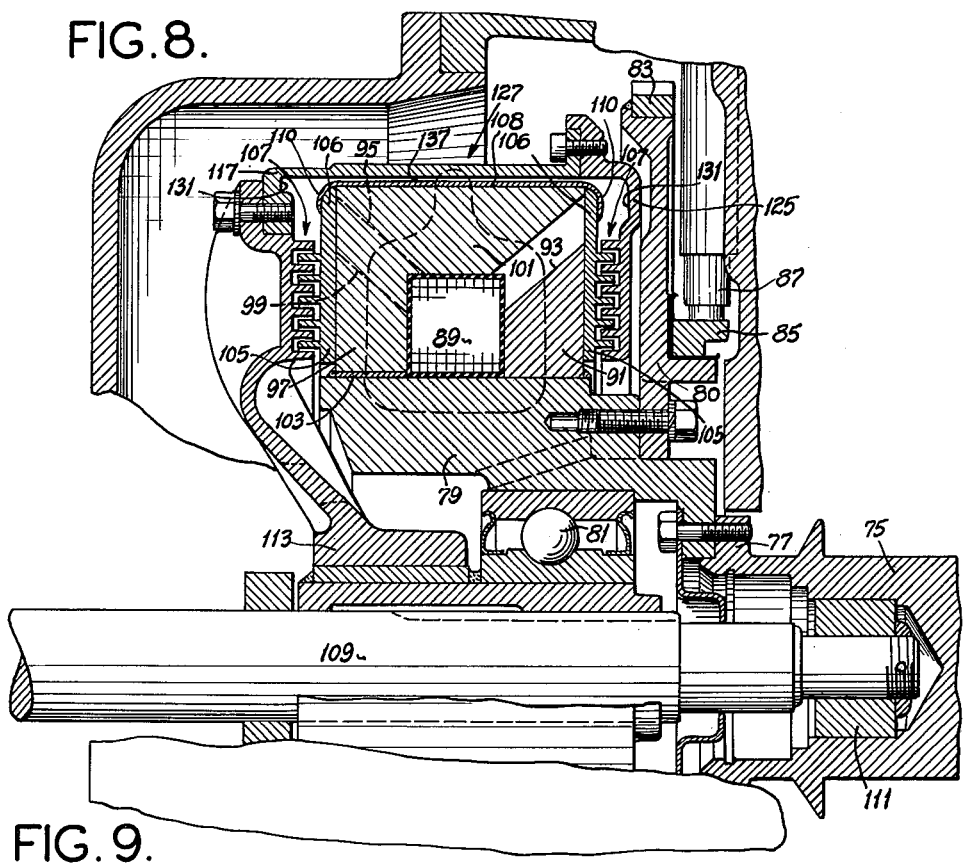
Fig. 8 is an axial section showing another form of the invention for operation with eddy currents and magnetic fluid; and, Fig. 9 is a chart showing typical torque and slip-speed relationships.

In Fig. 8 is shown another form of the invention designed for automotive practice. Numeral 75 shows a motor-driven quill which has bolted to its flange 77 the inner magnetic drum 79 of the field member. This drum is supported upon a bearing 81 and carries an auxiliary flywheel 80 and starter gear 83. The element 80 carries a collector ring 85, engaged by a brush 87. Only one collector ring is needed in this case, since the other side of the circuit from the coil, to be mentioned, is grounded.

Carried on the drum 79 is the field coil 89. On one side of the coil is a magnetic ring 91, notched as shown at 93 and provided with spaced claw-type teeth 95. On the other side of the coil 89 is a second magnetic ring 97, notched as shown at 99 and provided with oppositely extending teeth 101. The teeth 95 and 101 are interdigitated. In this case each entire polar tooth is integral with its ring, instead of being made up in two pieces, as in the Fig. 1 form. In this case no filler material is inserted between the teeth. A non-magnetic sleeve 103 under the ring 97 serves to provide a gap in the magnetic circuit for purposes already made clear. The form of the mean path of the magnetic circuit is suggested by the dash lines. Attached to the sides of the rings 91 and 97 are inner elements 105 of non-magnetic labyrinth seals 107, similar to those already described. However, the inner solid members 106 of the seals are extended up to the outer faces of the teeth 95 and 101. A steel band 108 about 1/64-inch thick is shrunk around the outside of the teeth 95 and 101. This band is then rolled over, as shown at 110, where it is soldered to the members 106. This construction, like the in-filling material 53 in Fig. 1, provides a relatively smooth exterior surface for the field member.

The driven shaft is shown at 109. It is piloted in the bearing 81 and in an auxiliary pilot bearing 111 in the member 75. The shaft 109 has keyed to it a non-magnetic spider 113 which supports a magnetic (iron) armature or inductor sleeve 117. The spider 113 carries outer elements of one seal 107. At the other end of the inductor sleeve 117 is a non-magnetic (aluminum) enclosing member 125. It carries outer elements of the second seal 107. The rotor is designated as a whole by numeral 127. Reservoirs 131 are formed in the rotor outside of the seals 107. It will be noted that these are non-magnetic.

The magnetic fluid, when magnetized, tends to adhere to a magnetic material, whereas it will flow more readily from a non-magnetic material when attracted by the magnetic concentrations from the poles 95 and 101. Thus upon energization of the coil 89 the magnetic fluid may more promptly be drawn into the gap 137 and out of the reservoirs 131.

The operation of the form of the invention shown in Fig. 8 is similar to that already described, except that under starting conditions the magnetic fluid is put into rotary action by the rotation of the field driving member. The fluid is thus slung out against the inner surface of the driven rotor 127 both when the latter is stationary and rotating. In addition, when this rotor 127 rotates, its centrifugal action will hold the magnetic fluid in a thin film away from the inner field member when the coil 89 is deenergized. Otherwise the operation of this form of the invention is similar to that already described in connection with Fig. 1.

The number of pole-forming teeth used on the various field members described depends upon the design characteristics desired. Whether or not the spaces between the teeth are blocked off by infilling (as at 53 in Fig. 1), or covered (as shown at 106, 108 in Fig. 8), or whether the spaces are left open (as shown in Fig. 7) depends upon the application of the clutch. In both the Fig. 1 and Fig. 8 forms, although the field member is electrically polarized, the field member is in effect made to present a smooth mechanical cylindric surface. The advantage of this is that if the clutch should stand still for an extended period of time in extremely cold weather, less torque is required to break loose any congealed magnetic fluid in the bottom of the clutch. The smooth surface reduces the effort required to break loose and shortens the time of fluid distribution. If a broken surface is permitted as in Fig. 7, for example, some piling up of such congealed magnetic fluid would occur temporarily, which would introduce a temporary unbalanced condition. In many applications this is unimportant, but in some it is. For example, it is of less importance where the output shaft is always loaded.

It will be clear that one, instead of two annular reservoirs could be used on one end of the rotor.

One advantage of two lateral reservoirs on opposite sides is that for a given width of inductor surface the magnetic fluid needs to be drawn only half the inductor surface width in order to reach and infill the central sections of the magnetic gap at the pole ends.

Figure 9:
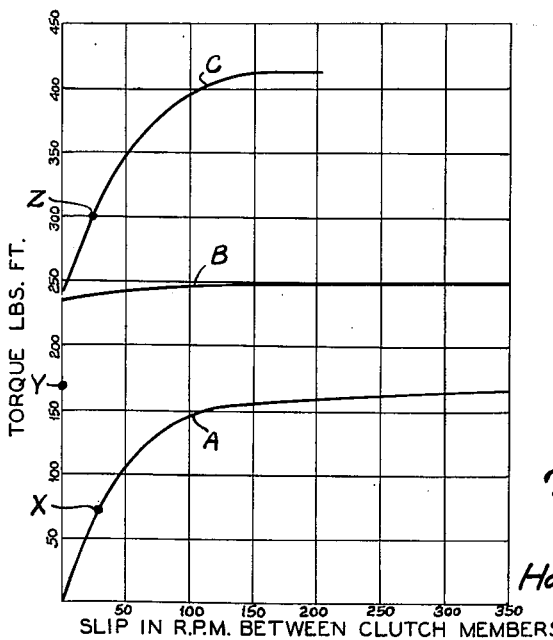

In Fig. 9 certain comparisons are made which will aid in understanding the invention, not otherwise apparent. In this figure, the ordinates indicate torque transmitted in lbs. ft., and the abscissae are slip speeds in R. P. M. between the driving and driven members. The values shown are for a clutch having a 10-inch mean diameter at the magnetic gap such as 65 in Fig. 1. If such a machine is operated without the magnetic fluid 71, and by means of eddy-current action only, the lower curve A is obtained. This curve passes through the origin, indicating that at zero slip speed, no torque is transmitted. In other words, torque depends upon slip, and in this type of machine slip is inherent. Point X on curve A indicates normal operating torque conditions.

Curve B shows the action of a similar machine wherein the magnetic-fluid drag effect only is used without eddy-current inductive action. A machine in which such action occurs is illustrated in Fig. 6. This curve B at zero slip transmits substantial torque, which is maintained as slip is increased. Point Y indicates the normal operating torque conditions for the machine of curve B.

Curve C is for a machine made according to Fig. 1, operating both by means of eddy-current induction and with the magnetic fluid therein. Point Z indicates the normal operating torque conditions for the machine of curve C. This curve C has an origin at the origin of curve B, indicating torque transmission at zero slip speed.

It will be observed that the normal operating torque for the machine of curve C is practically four times that of the machine of curve A. That is to say, the machine of Fig. 1, operating without magnetic fluid (curve A) has its normal capacity quadrupled by introducing the magnetic fluid (curve C). Curve B shows a flat characteristic of operation by means of the magnetic fluid and curve C may be seen virtually to be curve B with curve A superimposed upon it.

Curves A, B and C do not show the important feature that when the exciting coil is deenergized, the driving member may idle at substantial speed without any frictional loss in the magnetic fluid, which is slung clear of the relatively moving member, as shown in Fig. 3. It may be questioned why it should be desired to operate the machine of curve C with any slip when torque can be transmitted under zero slip conditions (i. e., locked condition between the relatively rotary members), which would place the point Z at the origin of curve C. The point in this connection is that a small amount of slip is often desirable at normal operating torque in order to absorb tortional vibrations which occur in most transmission machinery. It will be observed, however, that the approximately 25 R. P. M. slip associated with point Z is at a torque transmission of some 300 lbs. ft.; whereas in the case of point X, having approximately the same slip, the torque transmission is only 75 lbs. ft. An advantage of curve C over curve B is also that modulation of torque can be managed with change in slip.

While the invention has been described particularly for use as a clutch, it will be understood that various other dynamoelectric machines depend for their operation upon clutching action such as, for example, dynamometers, brakes and the like, and it is intended that the claims shall cover such and similar uses of the invention.

While the invention has been described to employ a liquid form of magnetic fluid, it is to be understood that it is also operative under proper design conditions with a powder or granular magnetic material, provided it has flowing characteristics. That is, the fluid can consist of dry powder or granular material without admixed oil or the like. Such material has flow properties in response to gravity and centrifugal force fields and the term magnetic fluid as used herein is intended to cover such cases. However, the fluid with admixed liquid is preferable because of the lubricating properties of the liquid. Also, the dry granular form of fluid requires dust seals between running parts which are less desirable than the labyrinth seals described herein. It is to be understood that the operation of the invention does not depend upon the precise initial viscosity of the fluid mixture of granulated magnetic materials and lubricant employed, the primary requirement being that it be of a fluid enough nature so as to distribute itself by flowing into the desired positions under the centrifugal forces involved, so as to open the magnetic gap under idling conditions, or so as to be drawn into position forming a magnetic connection across the gap under the magnetic forces involved.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A dynamoelectric machine comprising inner and outer relatively rotary magnetic armature and field members with a magnetic gap therebetween, the outer one of said members also constituting a chamber adapted to retain flowing granular magnetic material, granular magnetic material in said chamber of a flowing nature in an amount such as only partially to fill said gap without contacting the inner member when the material is under influence of rotation sufficient to induce centrifugal distribution of said material in the outer member, said material under a substantial field strength of the field member being magnetically influenced to take up a position bridging at least part of the gap.

2. A dynamoelectric machine made according to claim 1 wherein said armature member constitutes the outer relatively movable member.

3. A dynamoelectric machine made according to claim 1 wherein the field member is peripherally polarized so as to induce eddy currents in the armature member under conditions of movement relative thereto.

4. A dynamoelectric machine made according to claim 1 wherein said armature member constitutes the outer relatively movable member and wherein the field member is peripherally polarized so as to induce eddy currents in the outer member under conditions of movement relative thereto.

5. A dynamoelectric machine made according to claim 1 wherein peripherally extending magnetic north and south pole-forming members are carried upon the field member so as to induce eddy currents in the armature member upon relative movement between it and the field member.

6. A dynamoelectric machine made according to claim 1 wherein peripheral alternate north and south magnetic pole-forming members are carried upon the field member so as to induce reversing eddy currents in the armature member upon relative movement between it and the field member and to demagnetize the armature member and the magnetic fluid upon reduction in field strength of the field member.

7. A dynamoelectric machine made according to claim 1 wherein peripherally extending magnetic north and south poles are carried upon the field member so as to induce eddy currents in the armature member upon relative movement between it and the field member, the space between said poles being blocked off so as to present a substantially uninterrupted surface adjacent the armature member, said armature member also having a substantially uninterrupted surface facing the field member.

8. A dynamoelectric machine made according to claim 1 wherein an additional magnetic gap is located in one of said relatively rotary members in such a position as to intercept the field produced by the field member.

9. A dynamoelectric machine made according to claim 1 wherein said armature member constitutes the outer relatively movable member, and wherein interdigitated peripheral alternate magnetic north and south poles are carried upon the field member, and wherein an additional magnetic gap is provided in the field and associated with the field member.

10. A dynamoelectric machine comprising respectively outer and inner relatively rotary driving and driven magnetic armature and polarfield members with a magnetic gap therebetween, the outer armature member also constituting a chamber adapted to retain a magnetic fluid mixture, magnetic fluid mixture in said chamber in an amount such as only partially to fill said gap without contacting the inner member when the fluid mixture is under influence of rotation of the outer member sufficient to induce centrifugal distribution of said fluid mixture in the outer armature member, said fluid mixture under a substantial field strength of the field member being magnetically influenced sufficiently against centrifugal force to cause it to take up a position bridging at least part of the gap.

11. A dynamoelectric machine comprising relatively rotary outer and inner driving and driven members, the outer one of which consists of a substantially uninterrupted magnetic armature and the other a magnetic field member formed with peripherally spaced poles facing said armature at a magnetic gap, an annular field coil carried upon one of said members and providing a toroidal flux field interlinking them, a casing supporting the outer member and at least one lateral reservoir therein communicating with said gap, and an amount of magnetic fluid mixture in said casing adapted upon rotation of the outer member to take up a position in the gap with substantial spacing between it and the adjacent member when the coil is deenergized but to be drawn into said gap from the reservoir substantially to fill said gap upon energization of said coil.

12. A dynamoelectric machine made according to claim 11 in which said reservoir is composed of non-magnetic material.

13. A dynamoelectric machine comprising relatively rotary outer and inner driving and driven members, the outer one of which consists of a substantially uninterrupted magnetic armature and the other a magnetic field member formed with peripherally spaced poles facing said armature at a magnetic gap, an annular field coil carried upon one of said members and providing a toroidal flux field interlinking them, a casing supporting the outer member and forming lateral reservoirs on opposite sides of the gap and communicating therewith, and an amount of magnetic fluid mixture in said casing adapted upon rotation of the outer member to take up a position in the gap with substantial spacing between it and the adjacent member when the coil is deenergized but to be drawn into said gap from the reservoirs substantially to fill said gap upon energization of said coil.

14. A dynamoelectric machine made according to claim 13 in which said reservoirs are composed of non-magnetic material.

15. A dynamoelectric machine comprising relatively rotary magnetic members with a gap between said members, elements producing an electromagnetic field between said members, one of said members also constituting a chamber adapted to retain flowable material, flowable material constituted by granular magnetic particles and a lubricant in said chamber which is attracted by the field generated by said field producing elements, said material being of a volume such that upon excitation of the field producing elements it is drawn into said gap so as completely to bridge at least part of the gap, said chamber being located, formed and having a volume such that upon deenergization of the field producing elements and relative rotation between it and the armature member said chamber will receive a volume of such flowable material so as to leave a substantially free air gap between the rotary members.

MARTIN P. WINTHER.

REFERENCES CITED

The following references are of record in the file of this patent:

UNITED STATES PATENTS

| Number | Name | Date |
| --- | --- | --- |
| 505,025 | Brown | Sept. 12, 1893 |
| 711,300 | Earle | Oct. 14, 1902 |
| 811,654 | Murphy | Feb. 6, 1906 |
| 937,916 | Bentley | Oct. 26, 1909 |
| 1,493,851 | Ferris | May 13, 1924 |
| 2,011,408 | Jacobs | Aug. 13, 1935 |
| 2,106,882 | Betz | Feb. 1, 1938 |
| 2,300,223 | Hottenroth, Jr. | Oct. 27, 1942 |
| 2,401,187 | Prince | May 28, 1946 |
| 2,417,347 | Brown | Mar. 11, 1947 |
| 2,417,850 | Winslow | Mar. 25, 1947 |
| 2,428,471 | Pruitt et al. | Oct. 7, 1947 |

OTHER REFERENCES

Bureau of Standards Publication—Technical Report, 1213. Received in Div. 68, March 30, 1948.